(12) United States Patent
Rae et al.

(10) Patent No.: US 7,706,054 B2
(45) Date of Patent: Apr. 27, 2010

(54) PARAMETRIC GENERATION WITH LATERAL BEAM COUPLING

(75) Inventors: Cameron F. Rae, Fife (GB); Malcolm H. Dunn, Fife (GB); Jonathan A. Terry, Fife (GB)

(73) Assignee: The University Court of the University of St. Andrews, St. Andrews (GB)

( * ) Notice: Subject to any disclaimer, the term of this patent is extended or adjusted under 35 U.S.C. 154(b) by 0 days.

(21) Appl. No.: 11/658,543

(22) PCT Filed: Jul. 26, 2005

(86) PCT No.: PCT/GB2005/002912

§ 371 (c)(1),
(2), (4) Date: Sep. 15, 2008

(87) PCT Pub. No.: WO2006/010916

PCT Pub. Date: Feb. 2, 2006

(65) Prior Publication Data

US 2009/0040597 A1    Feb. 12, 2009

(30) Foreign Application Priority Data

Jul. 27, 2004    (GB)    ................... 0416673.2

(51) Int. Cl.
*G02F 1/35*    (2006.01)
*G02F 2/02*    (2006.01)
(52) U.S. Cl. ...................................................... 359/330
(58) Field of Classification Search .......... 359/326–332
See application file for complete search history.

(56) References Cited

U.S. PATENT DOCUMENTS 6,320,886 B1 * 11/2001 Dawber et al. ................ 372/22
6,421,166 B1 *  7/2002 Velsko et al. ................ 359/330
6,697,186 B2 *  2/2004 Kawase et al. .............. 359/330
6,903,341 B2 *  6/2005 Imai et al. ................... 250/340

* cited by examiner

*Primary Examiner*—Daniel Petkovsek

(57) ABSTRACT

An optical parametric device, for example an optical parametric generator or amplifier or oscillator, comprising a non-linear material (13) that is operable to generate a signal and an idler wave in response to being stimulated with a pump wave. The non-linear medium is such that the pump and idler waves are substantially collinear and the signal wave is non-collinear.

20 Claims, 6 Drawing Sheets

(a)

(b)

(a)

(b)

PARAMETRIC GENERATION WITH LATERAL BEAM COUPLING

This invention relates to the generation of electro-magnetic radiation through a parametric-wave generation process, and in particular radiation that is outside the normally accepted transparency range of the non-linear optical material used.

BACKGROUND OF THE INVENTION

Parametric devices are flexible and convenient sources of widely-tunable coherent radiation, encompassing all time-scales from the femtosecond pulse to the continuous-wave. In these, a coherent beam of electromagnetic radiation is used to stimulate a non-linear process in a non-linear optical crystal, resulting in the division of the power/energy in the coherent pump wave into two generated waves, typically referred to as the signal and idler waves. The signal is usually defined as that wave providing the useful output, and hence throughout this document is identified as the wave having the longer wavelength of the two generated waves.

Parametric devices can operate in a variety of configurations including amplifiers, oscillators and generators. In a parametric amplifier an intense coherent pump wave is made to interact with the nonlinear optical crystal to produce amplification at the signal and idler optical wavelengths. A parametric oscillator uses a parametric amplifier inside an optical cavity resonant at one or both of the signal and idler waves. Here, the signal and idler waves are either self-starting from noise/parametric fluorescence or the cavity is injection seeded by a suitable source operating at the signal and/or idler wavelength. A parametric generator generates optical waves by the interaction of an intense coherent pump wave with a nonlinear optical crystal to parametrically produce two other optical waves. No cavity is provided for the down-converted waves since parametric gain is sufficiently high as to allow adequate transfer of energy/power to these waves with only non resonant single (or multiple) passing of the pump and or idler and or signal waves through the nonlinear medium. Again, in this case the signal and/or idler waves are either self-starting from noise/parametric fluorescence or the generator is injection seeded by a suitable source operating at the signal and/or idler wavelength.

There is considerable interest in extending the spectral coverage of parametric devices. This is because they are often used as sources of coherent radiation in spectral ranges either not covered by any other sources, or where a single parametric-wave source is capable of replacing a number of sources that would otherwise be needed in order to provide the spectral coverage required. However, a serious limitation of known parametric devices is the detrimental effect of absorption of one or more of the three waves involved in the non-linear interaction within the nonlinear medium itself. As a result the spectral coverage attainable through a particular parametric generation scheme is often limited only by the presence of absorption and not by the nonlinear or phase-matching characteristics of the nonlinear medium being employed. Elimination of the restriction imposed by absorption would result in improved spectral coverage.

One solution for overcoming problems due to absorption has been identified. This involves using non-collinear phase-matching in such a way as to cause the wave subject to absorption, usually the signal wave, to rapidly walk-out of the nonlinear medium in a direction that is substantially lateral to the propagation direction of the pump wave. Examples of this technique are described in the articles "Efficient, tunable optical emission from LiNbO$_3$ without a resonator", by Yarborough et al, Applied Physics Letters 15(3), pages 102-104 (1969); "Coherent tunable THz-wave generation from LiNbO$_3$ with monilithic grating coupler", by Kawase et al, Applied Physics Letters 68(18), pages 2483-2485 (1996), and "Terahertz wave parametric source", by Kawase et al, Journal of Physics D: Applied Physics 35(3), pages R1-14 (2002).

FIG. 1 is an illustration of the known non-collinear phase-matching process. More specifically, FIG. 1(a) illustrates the geometry of the interacting pump 1, idler 2 and signal 3 waves in the nonlinear medium 4. FIG. 1(b) illustrates the phase-matching process through a so-called k-vector diagram, where $k_p$, $k_i$ and $k_s$ are the wavevectors of the pump, idler and signal waves respectively, angle $\theta$ is the angle subtended by the pump 1 and idler 2 waves and angle $\phi$ the angle subtended by the pump 1 and signal 3 waves.

As can be seen from FIG. 1(b), in the known non-collinear phase matching process the pump wave 1 and idler wave 2 are not themselves collinear within the nonlinear medium 4. However, to maintain the necessary nonlinear interaction between them throughout the length of the nonlinear medium 4, they must be of sufficient radial (transverse) extent to maintain an overlap between them throughout the length of the medium 4. This means that it is not possible to employ small (i.e. tightly focused) beam sizes for these waves. Having small beam sizes is desirable because it increases the intensities of the waves, so as to reduce the power or energy necessary for attaining a level of parametric gain required for the operation of the device.

SUMMARY OF THE INVENTION

An object of the present invention is to provide an improved optical parametric device.

According to one aspect of the invention, there is provided an optical parametric device, for example an optical parametric generator or amplifier or oscillator, comprising a non-linear material that is operable to generate a signal and an idler wave in response to being stimulated with a pump wave, wherein the non-linear medium is such that the pump and idler waves are collinear and the signal wave is non-collinear.

By arranging for the signal wave to be non-collinear with the other waves, this means that the signal wave walks-off from the other waves and exits the nonlinear medium within a short distance and hence with reduced absorption. Because the pump and idler beams are collinear, tight focusing of these beams is now possible. Hence, the parametric gain available for a given pump power/energy is not restricted, as described previously, by the requirement to maintain relatively large beam sizes for the purpose of ensuring beam overlap throughout the length of the nonlinear medium. An advantage of tight focusing of the pump and idler beams is that these beams may now be propagated closer to the edge of the nonlinear medium so further reducing the path over which the signal beam must propagate before exiting the medium. This further reduces the absorption losses to which this beam is subjected. Having the pump and idler waves collinear means that common elements can be used such as, but not restricted to, mirrors for the guidance of these waves. This can simplify otherwise complicated arrangements.

Preferably, the non-linear material is a slant-stripe-type periodically-poled crystal, for example lithium niobate. Slant-stripe-type nonlinear crystals are known, and have been used in a difference frequency generation process, see the article "Terahertz-wave surface-emitted difference frequency generation in slant-stripe-type periodically poled LiNbO$_3$ crystal" by Sasaki et al, Applied Physics Letters 81(18), pages 3323-3325 (2002). However, this type of crystal has not previously been used in a parametric device in which a single pump wave is used to generate signal and idler waves. FIG. 2 illustrates the non-linear process that occurs in a slant-stripe-type periodically-poled crystal when it is pumped with a single pump wave. In this case, the pump wave is collinear with the idler wave, but the signal wave walks-off in a direction substantially lateral to the pump wave.

Preferably, the device is a singly-resonant parametric oscillator that has a cavity for resonating the idler wave alone. The idler wave may be generated within this cavity as a result of the parametric gain acting initially upon either parametric noise originating within the nonlinear medium itself or any (weak) input wave from an external source that is employed for the purpose of seeding the idler wave cavity.

The non-linear material may be located within a cavity of the pump laser. This is generally referred to as an intra-cavity geometry. In this configuration, the active medium of the pump laser and the non-linear medium are both located within a common cavity, and both the pump wave and preferably the idler wave are resonated by a common set of cavity mirrors, which simultaneously form the pump cavity and the parametric oscillator cavity. Generating the pump wave within this common cavity means that the pump wave does not have to be coupled into the parametric oscillator cavity from an external source. This provides several advantages, particularly where a slant-stripe-type phase matching process is used. In this case, the signal wave is generally of much longer wavelength than the pump and idler waves, and the idler wave is generally of a similar wavelength to the pump wave. The idler and pump waves have similar polarisation states and are arranged so as to propagate collinearly. In the case of the singly resonant optical parametric oscillator where only the idler wave is resonated, a coupling optic is required that ideally has high reflectivity for the idler wave and high transmission for the pump wave, or vice versa. This can be difficult to fabricate where the pump and idler waves are of similar wavelengths, similar polarisation and arranged to propagate collinearly. Using an intra-cavity configuration can however eliminate these difficulties, because the need for a coupling optic is avoided. It also avoids the need for beam matching and isolator components. Additionally, within the pump cavity region the pump power is greater than that available outside a similar but optimally output coupled pump source, thus exposing the nonlinear crystal to a higher pump wave intensity than would otherwise be the case outside the pump source resonator.

While various intra-cavity geometries have been described previously, for example in "Low-pump-threshold continuous-wave singly resonant optical parametric oscillator" by Stothard et al, Optics Letters 23(24), pages 1895-1897 (1998), these do not recognise the benefit of the technique in the context of the collinear propagation of pump and idler waves when these waves have similar properties with regard to frequency, polarisation and spatial configuration.

In another embodiment of the invention, the device may have a pump-enhancement cavity geometry, namely a geometry where the nonlinear medium of the parametric generator/amplifier/oscillator is located within a cavity which is capable of resonating the pump wave (provided by an external pump laser) as well as preferably simultaneously the idler wave, thereby forming a parametric oscillator.

Using a pump enhanced geometry provides an alternative means for overcoming the difficulties highlighted previously that arise due to the collinear propagation of the pump wave and generated idler wave which have substantially the same wavelengths and similar polarisation and spatial configurations. This is because when the pump wave is resonated and hence enhanced within the pump-enhancement cavity the optimum transmission of the input coupling optic for the pump wave is typically around 5%. When in this optimum condition complete transmission of the input pump wave into the cavity results and the device is so called impedance matched. Hence, even where the pump and idler waves are of similar wavelengths and polarisations, current state-of-the-art mirror fabrication allows the required high reflectivity (>95%) to be provided by this mirror for the resonated idler wave, so enabling this mirror to serve as a common optic for the idler and pump waves as required. A further known advantage of the pump-enhancement approach is that the pump power requirement from the pump laser is less than would otherwise be required with no pump-enhancement cavity. The pump-enhancement approach is particularly, but not exclusively, appropriate to the case of continuous-wave devices.

Pump enhancement arrangements are currently available and are ideally suited for use in the device of the present invention. For example, various pump-enhanced geometries are described in "Continuous-wave singly resonant pump-enhanced type II $LiB_3O_5$ optical parametric oscillator" by Robertson et al, Optics Letters 19, pages 1735-1737 (1994). However, these known arrangements do not recognise the benefit of the technique, as described above, in the context of the collinear propagation of pump and idler waves when these waves have similar properties with regard to frequency, polarisation and spatial configuration.

As an alternative solution to the problem of how to reduce or overcome the effects of absorption, according to another aspect of the invention, there is provided an optical parametric device, for example an optical parametric generator or amplifier or oscillator, comprising a nonlinear medium that is operable to generate a signal and an idler wave in response to being stimulated with a pump wave, wherein the nonlinear medium is such that the pump, idler and signal waves are non-collinear, and the pump wave source and the nonlinear medium are provided in the same optical cavity.

Providing the pump source and the nonlinear medium in the same optical cavity, means that the pump wave in the nonlinear medium is greater than would otherwise be attained if the nonlinear medium were to be located outside of the cavity, thereby limiting the difficulties associated with reduced wave overlap generally resulting from the non-collinear propagation of the beams. Further, the need to provide coupling optics to couple the pump wave into the optical cavity is eliminated. In this way, although absorption is not necessarily reduced, its effects can be mitigated by the enhanced power pump wave circulating within the common optical cavity.

According to yet another aspect of the present invention, there is provided an optical parametric device, for example an optical parametric generator or amplifier or oscillator, comprising a nonlinear material that is operable to generate a signal and an idler wave in response to being stimulated with a pump wave, wherein the nonlinear medium is provided in an optical cavity that is arranged to resonate the pump wave, and the pump wave and the generated idler and signal waves are non-collinear.

By making the optical cavity resonant at the pump wavelength, the pump power is enhanced so that the parametric generation process is improved, despite the limited overlap between the pump and idler waves.

Because the various optical parametric devices in which the invention is embodied reduce or indeed avoid, at least partially, the effects of absorption losses, they allow for the realisation of practical sources that can provide terahertz (0.3-10 THz) frequency radiation and long-wave infrared radiation (10-100 microns wavelength). Both these frequency bands are useful for spectroscopic analysis of materials, for example detection of chemical and biological substances in biomedical and security applications. THz is also of interest in the structural analysis of materials, for example defect detection and analysis. The exploitation of these frequency bands has however previously been impaired by a lack of practical sources.

BRIEF DESCRIPTION OF DRAWINGS

Various aspects of the invention will now be described for the purpose of example only and in conjunction with the accompanying drawings, of which.

DESCRIPTION OF EMBODIMENTS

Figure 1:
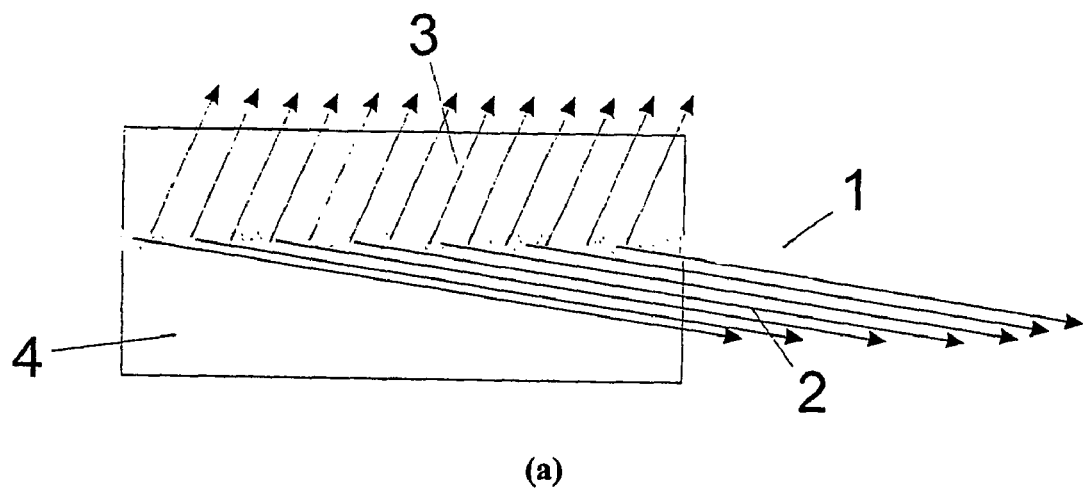
FIG. 1(a) illustrates a geometric interaction of a known non-collinear phase-matching process.
FIG. 1(b) illustrates a k-vector diagram of the known non-collinear phase-matching process.
Figure 1:
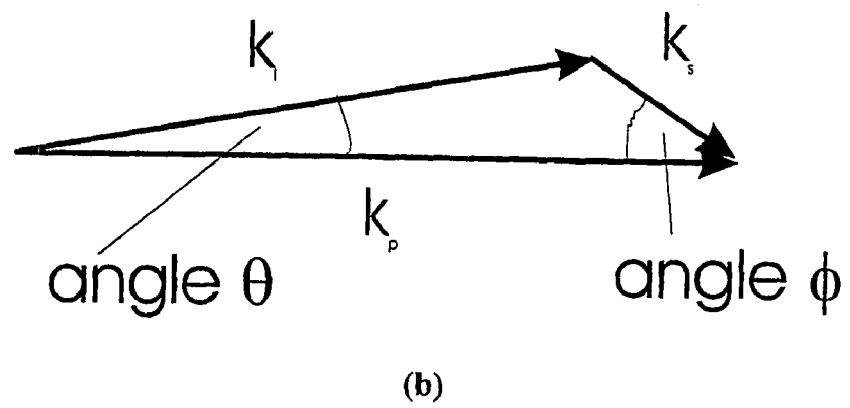
Figure 2:
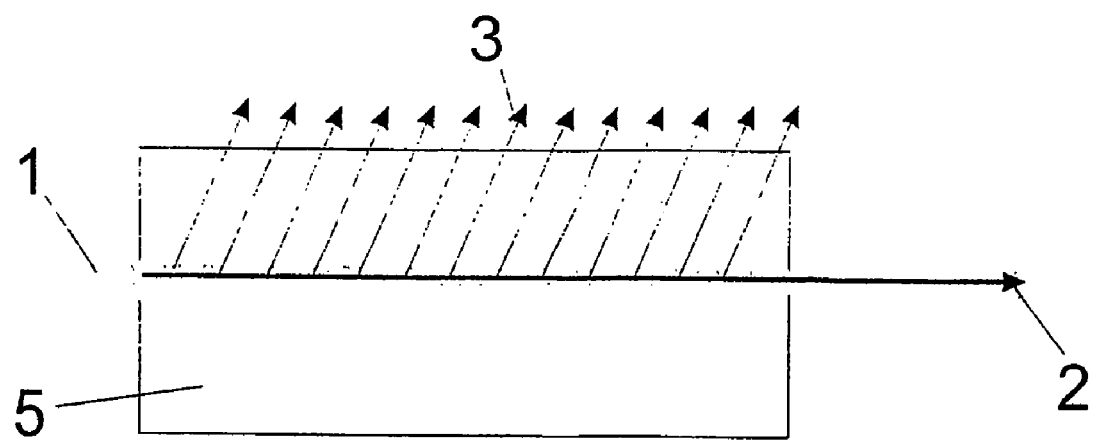
FIG. 2(a) illustrates a geometric interaction of a non-linear process in a slant-stripe-type periodically-poled crystal.
FIG. 2(b) illustrates a k-vector diagram of the non-linear process in the slant-stripe-type periodically-poled crystal.
Figure 2:
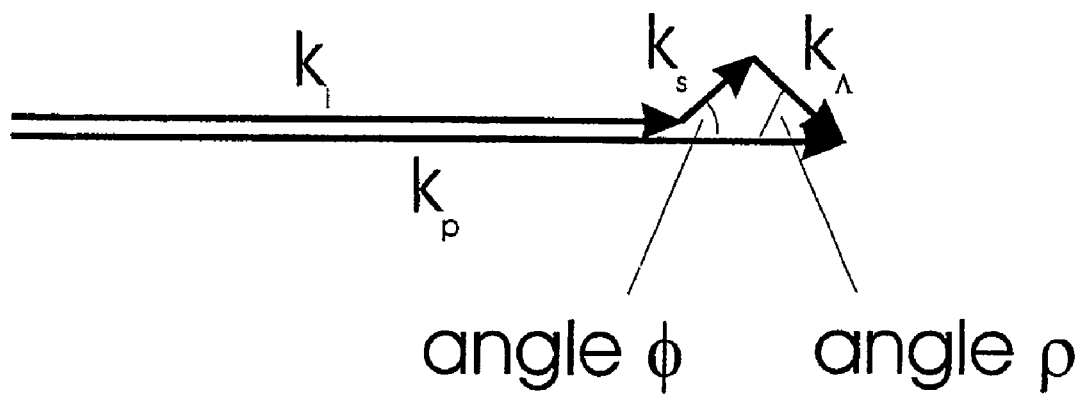
Figure 3:
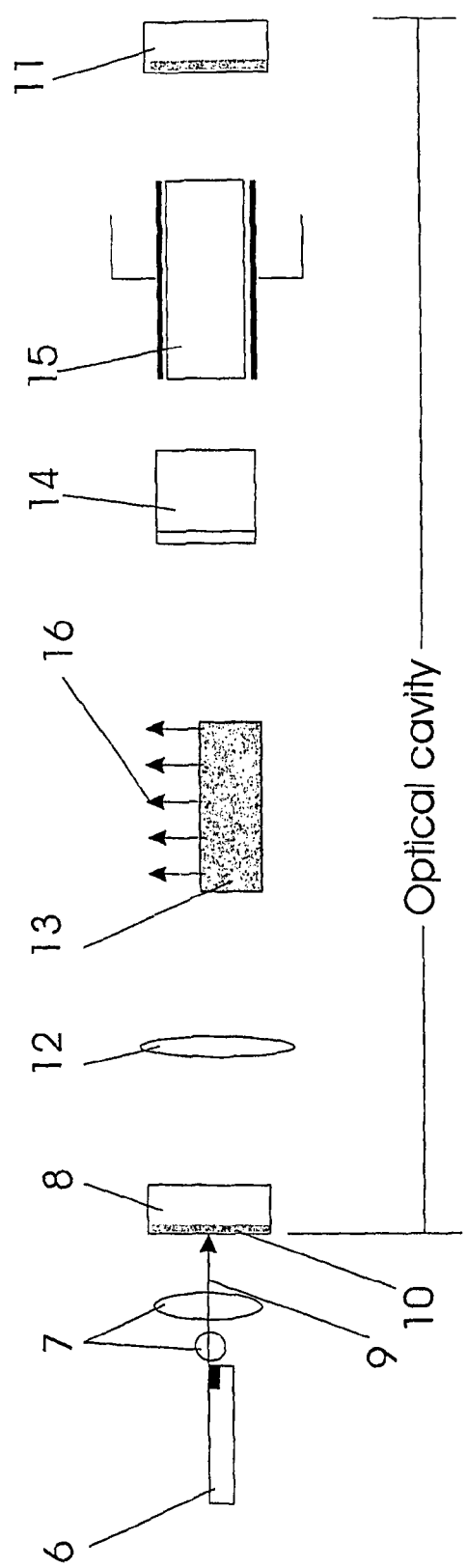
FIG. 3 is an intracavity optical parametric oscillator oscillator incorporating a hybrid collinear/non-collinear phase-matching scheme and operating in a pulsed mode.

FIG. 3 shows an intracavity optical parametric oscillator comprising a diode-laser pumped solid-state laser with an active Q-switch to provide pump pulses of short (nanosecond regime) duration. Within the solid-state laser is incorporated an optical parametric oscillator based on a hybrid collinear/non-collinear phase matching method. More specifically there is provided a laser excitation arrangement having a semiconductor diode-laser 6, a lens system 7 and a laser gain medium 8 into which optical radiation 9 from the semiconductor diode-laser 6 is directed. The lens system 7 is provided for optimally matching the spatial profile of the radiation from the semiconductor diode-laser 6 to the mode size, preferably the fundamental $TEM_{00}$ mode, of the radiation in the laser gain medium 8. As a specific example, the laser gain medium is based on the class of laser crystals containing the neodymium active ion, and the semiconductor diode-laser is adapted to deliver optical radiation in the range 795-815 nm, depending on the particular choice of laser crystal, where strong absorption features exist. The semiconductor diode-laser may also be of a pulsed or continuous-wave type. It will be appreciated that other laser crystal types and laser excitation means may also be usefully employed, including for example flash lamp pumping.

On a back surface of the laser gain medium 8, and integral with it, is a reflective coating that defines a first mirror 10. Opposite the laser gain medium 8 is a second reflective surface 11, so forming an optical cavity. Between the laser gain medium 8 and the second reflective surface 11, and along an optical axis thereof, are in sequence a lens 12, a slant-stripe-type nonlinear crystal 13, a polariser 14 and an electro-optic Q-switch crystal 15. The purpose of the lens 12 is to enable the appropriate mode sizes to be obtained in the laser gain medium 8 and the nonlinear crystal 13, when used in association with the first and second mirrors 10 and 11. The purpose of the polariser 14 and electro-optic Q-switch 15 is to controllably modify the Q (or finesse) of the optical cavity in such a way as to generate a pump wave consisting of a sequence of short pulses. The purpose of the slant-stripe-type nonlinear crystal 13 is to cause the signal wave to walk off, whilst maintaining the pump and idler waves collinear. Any suitable slant-stripe-type crystal could be used, but as a specific example, the arrangement of FIG. 3 includes a periodically poled lithium niobate (PPLN) that has a grating period of around 33.3-$\square$m and grating vector orientated at around 65.7-deg from the x-axis and is located in an oven (not shown).

Each of the first and second mirrors 10 and 11 is highly reflective at the wavelength of light emitted from the laser gain medium 8, so causing the laser radiation emitted by the laser gain medium 8 to be, during such time period as allowed by the polariser 14 and Q-switch 15 combination, reflected back and forth. This results in a pump wave with a circulating power/energy substantially higher than the power/energy of the output achieved for an optimally output coupled laser with similar laser excitation means.

When the arrangement of FIG. 3 is used, stimulation of the nonlinear crystal 13 by the pump wave causes an optical parametric down conversion process to start and so generate a pair of signal and idler waves. Because the crystal 13 is a slant-stripe-type, the generated idler wave is collinear with the pump wave while the generated signal wave 16 walks-off from the other waves. Preferably the signal wave walks-off at an obtuse angle and in the specific example given is transverse to the pump and idler waves. As a specific example, for the nonlinear crystal 13 described above, for a pump wave of wavelength 1.064-microns, the idler wave is around a wavelength of 1.07-microns and the signal wave is around a wavelength of 0.19-millimeters (1.6-THz).

The parametric wave generation process has associated with it a threshold level of pump wave intensity for a given set of operating conditions. To reduce this threshold level the nonlinear crystal 13 is located in an optical cavity that is resonant at one or both of the signal and idler wave wavelengths so forming an optical parametric oscillator. In the arrangement shown in FIG. 3, each of the first and second mirrors 10 and 11 is also highly reflective at the wavelength of the idler wave radiation generated in the nonlinear crystal 13 so forming a resonant cavity for this wave also.

In this embodiment, because the pump and idler waves are collinear, the beam cross section may be made small and hence a high circulating intensity and consequently improved nonlinear gain can be achieved. A further advantage of the small beam cross section is to allow the pump and idler waves to propagate close to the lateral face of the nonlinear crystal 13. Hence, the signal wave 16 may exit the nonlinear crystal 13 after only a short propagation distance and so minimal absorption. It is a further advantage that as the pump and idler waves are of similar wavelength, the optical cavity has a similar effect on each of these waves and hence they are inherently mode matched.

Figure 4:
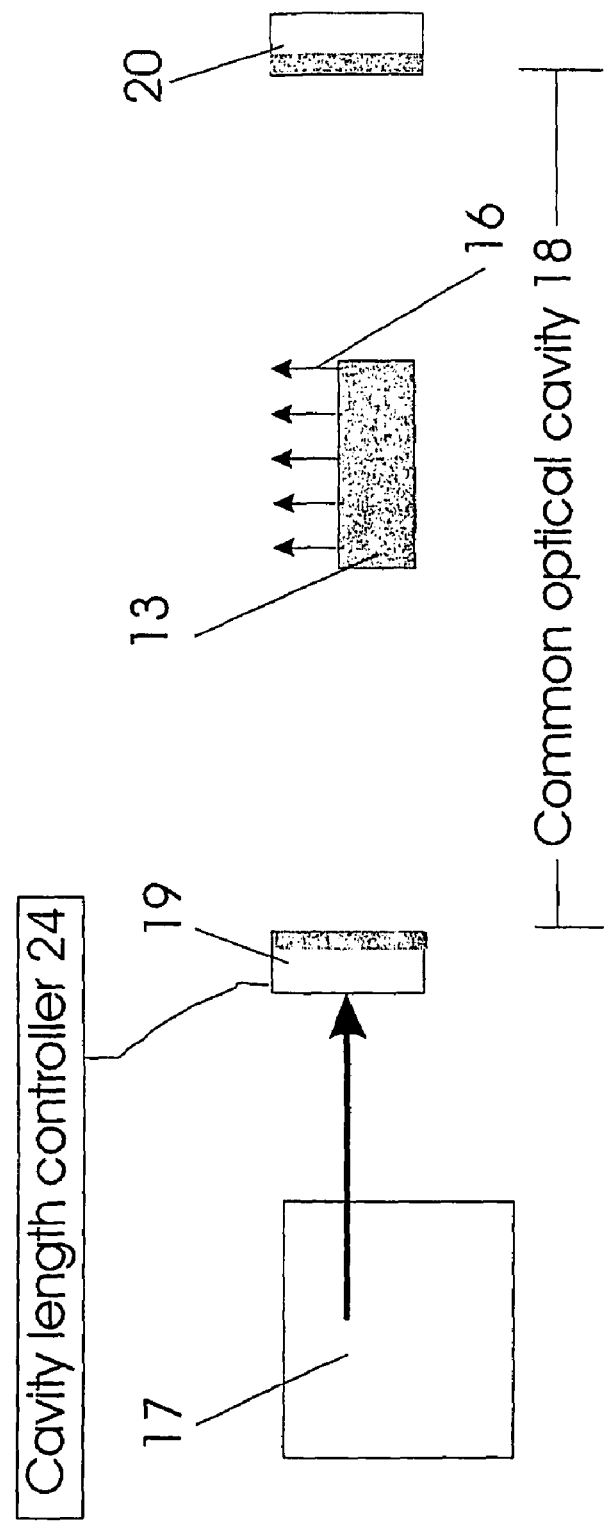
FIG. 4 is a pump-enhanced optical parametric oscillator incorporating a hybrid collinear/non-collinear phasematching scheme and operating in a pulsed mode.

FIG. 4 shows another arrangement in which the invention is embodied, this being a pump-enhanced optical parametric oscillator. This includes a laser arrangement 17 providing a pump wave for a non-linear crystal 13 that is in a common optical cavity 18 that resonates both the pump wave, obtained in this case from an external source, and parametric idler wave. The pump wave is coupled into the optical cavity 18 by way of a lens, which is chosen so that the pump wave is mode-matched into a transverse mode of the cavity. Typically, this is the fundamental (TEM$_{00}$) mode of the cavity. Any suitable laser pump could be used, although preferably a semiconductor diode-laser or diode-laser pumped solid-state laser is employed. The pump wave generator has to generate radiation that is of high spectral purity, i.e. single longitudinal mode, and of high spatial quality, i.e. single transverse mode.

The nonlinear crystal 13 of FIG. 4 may be of any suitable type, but as an example is of periodically poled lithium niobate (PPLN) that has a grating period of around 33.3-□m and grating vector orientated at around 65.7-deg from the x-axis. This is located in an oven (not shown). For this particular crystal, and pump and idler wave radiation propagating along the crystallographic x-axis and their electric fields polarised along the z-axis, then for a pump wavelength of 1.064-microns, the idler wavelength will be around 1.07-microns and the signal wavelength around 0.19-millimeters (1.6-THz).

The optical cavity 18 is defined by mirrors 19 and 20. Preferably the reflectivity of mirror 20 for the pump wavelength is unity, while the transmission of mirror 19 for the pump wavelength is equivalent to the total loss, both linear and nonlinear but excluding the transmission of mirror 19 itself, experienced by the pump wave in one round trip of the optical cavity 18. Under these conditions the cavity 18 is said to be impedance matched and then the down-conversion efficiency is then optimised. Preferably mirrors 19 and 20 are both highly reflecting at the idler wavelength for the purpose of resonating the idler wave in the common cavity 18 with low round-trip loss, hence minimising the internal threshold of the oscillator.

It will be appreciated that although the pump and idler waves are of similar wavelength, polarisation state and spatial configuration in the case of the collinear propagation of these two waves, it is within the present state of the art with regard to mirror design to be able to fabricate a mirror having the required properties of mirror 19 as described above. Therefore the adoption of the pump-enhanced geometry as described with reference to FIG. 4 is a solution to the problem highlighted previously when a collinear propagation geometry for the idler and the pump waves is adopted.

The mirrors 19 and 20 are positioned so that the optical cavity 18 is resonant at the pump wavelength. To fulfill this condition, the cavity mirrors, i.e. mirrors 19 and 20, have to be separated by an integer number of half-wavelengths of the wave, in this case the pump wave. To ensure that a resonant condition can be maintained, connected to the first mirror 19 is a drive mechanism, for example a piezzo electric transducer (not shown), that is able to move the mirror in a controllable manner along the direction of the optical axis of the cavity. By controlling the drive mechanism using a suitable control system 24, the first mirror 19 can be moved so that the cavity length is adjustable. In this way, it is possible to tune the cavity length such that the frequency of the single frequency pump wave is an axial mode of the cavity and so that the pump wave resonates within the optical cavity 18.

Causing resonance of the pump wave builds up the intensity of that wave inside the optical cavity 18 to a level that is above that of the incident pump wave, so that the pump wave is enhanced. The pump wave intensity is typically increased by a factor of 10 or more. As has already been described, the transmission shown by the first mirror 19 to the pump wave is generally chosen such that when the parametric oscillator is operating under the specified conditions then the pump cavity is impedance matched. This means that there is no back reflected pump wave from the first mirror 19 and all of the incident pump wave enters the optical cavity 18, where apart from parasitic losses it is all converted into down converted idler and signal waves.

When the nonlinear crystal 13 is stimulated with the pump wave, a range of signal and idler wavelength pairs, all having different frequencies, are generated. Only those pairs for which the idler frequency is resonant within the common optical cavity experience sufficient feedback to survive and grow. This means that these generators self seek a resonant condition. The significance of this is that the actual length of the optical cavity in respect to the down converted waves is not critical, because the resonant down converted wave (the idler wave in this example) will self seek a resonant frequency.

Because the pump and idler waves are collinear, the beam cross-section may be made small and hence a high circulating intensity of the pump wave in the common cavity 18 can be attained and consequently improved nonlinear gain achieved. A further advantage of the small beam cross section is to allow the pump and idler waves to propagate close to the lateral face of the nonlinear crystal 13 and so the signal wave 16 may exit the nonlinear crystal 13 after only a short propagation distance and hence minimal absorption.

Figure 5:
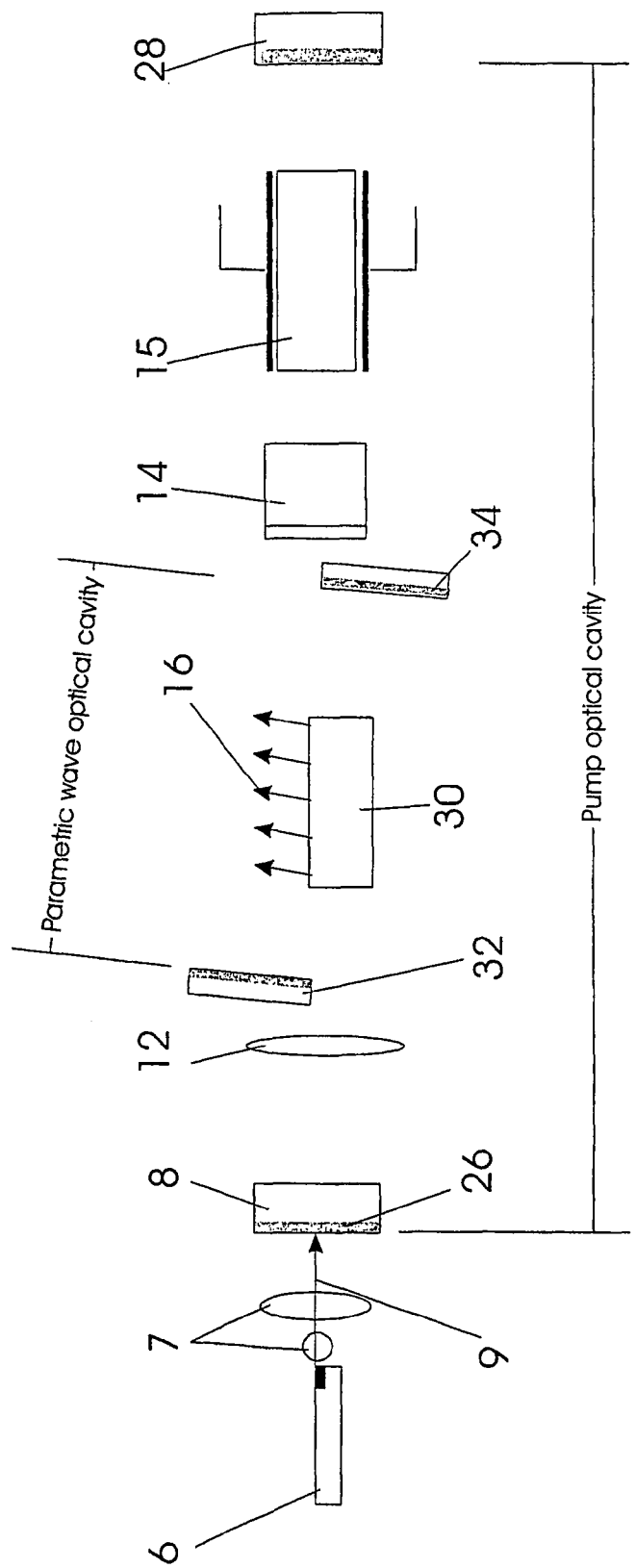
FIG. 5 is a schematic diagram of an intracavity optical parametric oscillator incorporating a non-collinear phase-matching scheme and operating in a pulsed mode.

FIG. 5 shows another intracavity optical parametric oscillator. This has a diode-laser pumped solid-state laser with an active Q-switch to provide pump pulses of short (nanosecond regime) duration and within which said solid-state laser is incorporated an optical parametric oscillator based on the non-collinear phase matching method. More specifically there is provided a laser excitation arrangement having a semiconductor diode-laser 6, a lens system 7 and a laser gain medium 8 into which optical radiation 9 from the semiconductor diode-laser 6 is directed. The lens system 7 is provided for optimally matching the spatial profile of the radiation from the semiconductor diode-laser 6 to the mode size, preferably the fundamental TEM$_{00}$ mode, of the radiation in the laser gain medium 8. As a specific example, the laser gain medium is based on the class of laser crystals containing the neodymium active ion, and the semiconductor diode-laser is adapted to deliver optical radiation in the range 795-815 nm, depending on the particular choice of laser crystal, where strong absorption features exist. The semiconductor diode-laser may also be of a pulsed or continuous-wave type. It will be appreciated that other laser crystal types and laser excitation means may also be usefully employed, including for example flash lamp pumping.

On a back surface of the laser gain medium 8, and integral with it, is a reflective coating that defines a first mirror 26. Opposite the laser gain medium 8 is a second reflective surface 28, so forming an optical cavity for the pump wave. Between the laser gain medium 8 and the second reflective surface 28, and along an optical axis thereof, are in sequence a lens 12, a nonlinear crystal 30 designed for non-collinear phasematching, a polariser 14 and an electro-optic Q-switch crystal 15. The purpose of the lens 12 is to enable the appropriate mode sizes to be obtained in the laser gain medium 8 and the nonlinear crystal 30, when used in association with the first and second mirrors 26 and 28. The purpose of the polariser 14 and electro-optic Q-switch 15 is to controllably modify the Q (or finesse) of the optical cavity in such a way as to generate a pump wave consisting of a sequence of short pulses. The purpose of the non-collinear phasematching scheme is to cause the signal wave to walk off at a large angle whilst the pump and idler waves propagate at a small and non-zero angle relative to one another.

In order that the generated idler wave propagates at the required small angle to the pump wave, the axis of the idler wave cavity, defined by mirrors 32 and 34, is arranged to be at this required small angle to the axis of the pump wave cavity by suitable placement of such mirrors as shown in FIG. 5. The mirrors 32 and 34 are made to be highly reflective at the wavelength of the idler wave radiation generated in the non-linear crystal 30 and aligned to have a common optical axis, so forming a resonant cavity for this wave, but inclined to the pump cavity optical axis. Any suitable non-collinear phase-matching scheme could be used, but as a specific example, the arrangement of FIG. 5 includes a lithium niobate crystal that is cut so that the pump and idler waves propagate along a direction close to co-axial with the crystallographic x-axis of the crystal, where the angle subtended between the waves is between 1 and 2 degrees. The signal wave propagates at an angle of around 65 degrees relative to the pump direction. The polarisation state of all the waves is parallel to the crystallographic z-axis.

Each of the first and second mirrors 26 and 28 is highly reflective at the wavelength of light emitted from the laser gain medium 8, so causing the laser radiation emitted by the laser gain medium 8 to be, during such time period as allowed by the polariser 14 and Q-switch 15 combination, reflected back and forth. This results in a pump wave with a circulating power/energy substantially higher than the power/energy of the output achieved for an optimally output coupled laser with similar laser excitation means.

When the arrangement of FIG. 5 is used, stimulation of the nonlinear crystal 30 by the pump wave causes an optical parametric down conversion process to start and so generate a pair of signal and idler waves. As a specific example, for the nonlinear crystal 30 described above, for a pump wave of wavelength 1.064-microns, the idler wave is around a wavelength of 1.068-1.072 microns. The corresponding signal wave is around a wavelength of 0.15-0.29 millimeters (1-2 THz) and propagates at an angle of around 65 degrees to the pump direction, hence exiting the nonlinear crystal through a lateral face.

The parametric wave generation process has associated with it a threshold level of pump wave intensity for a given set of operating conditions. By locating the nonlinear crystal 30 in an optical cavity that is resonant at the idler wave wavelength, so forming an optical parametric oscillator, this threshold level can be reduced.

Figure 6:
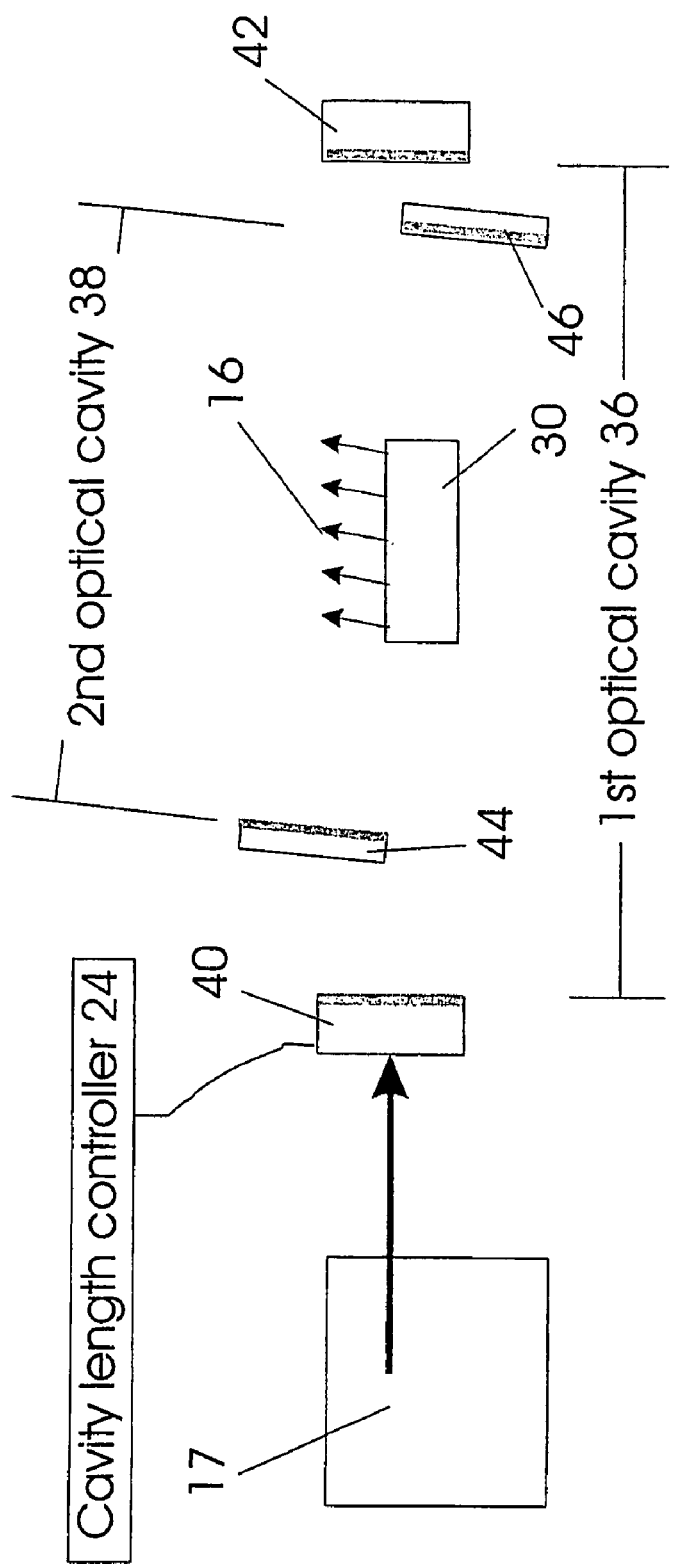
FIG. 6 is a schematic diagram of a pump-enhanced optical parametric oscillator incorporating a non-collinear phase-matching scheme and operating in a continuous-wave mode.

FIG. 6 shows another arrangement in which the invention is embodied, this being a pump-enhanced optical parametric oscillator incorporating a non-collinear phase-matching geometry. This includes a laser arrangement 17 providing a pump wave for a non-linear crystal 30 that is in an optical cavity 36 that resonates the pump wave, obtained in this case from an external source, and a separate optical cavity 38 that resonates the parametric idler wave and arranged at some angle to the first optical cavity 36. The pump wave is coupled into the optical cavity 36 by way of a lens, which is chosen so that the pump wave is mode-matched into a transverse mode of the optical cavity 36. Typically, this is the fundamental (TEM$_{00}$) mode of the cavity. Any suitable laser pump could be used, although preferably a semiconductor diode-laser or diode-laser pumped solid-state laser is employed. The pump wave generator has to generate radiation that is of high spectral purity, i.e. single longitudinal mode, and of high spatial quality, i.e. single transverse mode.

Any suitable non-collinear phasematching scheme could be used, but as a specific example, the arrangement of FIG. 6 includes a lithium niobate crystal that is cut so that the pump and idler waves propagate along a direction close to co-axial with the crystallographic x-axis of the crystal, where the angle subtended between the waves is between 1 and 2 degrees. The signal wave propagates at an angle of around 65 degrees relative to the pump direction. The polarisation state of all the waves is parallel to the crystallographic z-axis. For a pump wavelength of 1.064-microns and nonlinear crystal 30 described above, the idler wave is around a wavelength of 1.068-1.072 microns and the signal wave is around a wavelength of 0.15-0.29 millimeters (1-2 THz) and exits the nonlinear crystal through a lateral face.

The pump wave optical cavity 36 is defined by mirrors 40 and 42. Preferably the reflectivity of mirror 42 for the pump wavelength is unity, while the transmission of mirror 40 for the pump wavelength is equivalent to the total loss, both linear and nonlinear but excluding the transmission of mirror 40 itself, experienced by the pump wave in one round trip of the optical cavity 36. Under these conditions the cavity 36 is said to be impedance matched and then the down-conversion efficiency is then optimised. Mirrors 44 and 46 are both highly reflecting at the idler wavelength for the purpose of resonating the idler wave in another optical cavity 38 with low round-trip loss, hence minimising the internal threshold of the oscillator.

The mirrors 40 and 42 are positioned so that the optical cavity 36 is resonant at the pump wavelength. As is well known, to fulfill this condition, the cavity mirrors, i.e. mirrors 40 and 42, have to be separated by an integer number of half-wavelengths of the wave, in this case the pump wave. To ensure that a resonant condition can be maintained, connected to the first mirror 40 (or alternatively this may be the second mirror 42) is a drive mechanism, for example a piezo electric transducer (not shown), that is able to move the mirror in a controllable manner along the direction of the optical axis of the cavity. By controlling the drive mechanism using a suitable control system 24, the first mirror 40 can be moved so that the cavity length is adjustable. In this way, it is possible to tune the cavity length such that the frequency of the single frequency pump wave is an axial mode of the cavity and so that the pump wave resonates within the optical cavity 36.

Causing resonance of the pump wave builds up the intensity of that wave inside the optical cavity 36 to a level that is above that of the incident pump wave, so that the pump wave is enhanced. The pump wave intensity is typically increased by a factor of 10 or more. As has been already described, the transmission shown by the first mirror 40 to the pump wave is generally chosen such that when the parametric oscillator is operating under the specified conditions then the pump cavity is impedance matched. This means that there is no back reflected pump wave from the first mirror 40 and all of the incident pump wave enters the optical cavity 36, where apart from parasitic losses it is all converted into down converted idler and signal waves.

When the nonlinear crystal 30 is stimulated with the pump wave, a range of signal and idler wavelength pairs, all having different frequencies, are generated. Only those pairs for which the idler frequency is resonant within the common optical cavity experience sufficient feedback as to survive and grow. This means that these generators self seek a resonant condition. The significance of this is that the actual length of the optical cavity in respect to the down converted waves is not critical, because the resonant down converted wave (the idler wave in this example) will self seek a resonant frequency.

By providing a simple and effective mechanism for reducing the detrimental effects caused by signal wave absorption, the present invention allows the spectral range of parametric devices to be extended. Important spectral regions that would benefit from the removal of the restriction due to absorption include the mid- and far-infrared spectral regions, the terahertz spectral region and the near- and far-ultraviolet spectral regions, but these are by way of example only and such benefits could well apply to other spectral regions not specifically identified. To provide devices that operate in these ranges, the generic design of the device would be similar to that described above. However the detailed design of the components used would change. For example, the nonlinear material must show gain for the desired operating conditions of pump wavelength and parametrically generated wavelengths. This is achieved through a suitable choice of nonlinear crystal material and crystal fabrication, i.e. phase-matching, for example propagation direction in the crystal and in the case of the hybrid collinear/non-collinear phase-matching scheme described with reference to FIGS. 3 and 4 the periodic domain reversal period and angle.

A skilled person will appreciate that variations of the disclosed arrangements are possible without departing from the invention. For example, although not described herein in detail, for the intra-cavity embodiments, an external source of radiation of a wavelength corresponding to the idler wavelength may be used to seed the common idler/pump wave cavity. In addition, although a slant type periodically poled nonlinear medium is described for use in the arrangements of FIGS. 3 and 4, it will be appreciated that a nonlinear medium having its grating vector parallel and perpendicular to its external faces may be used, provided it is positioned within the device so that it is tilted relative to the angle of incidence of the pump wave. Accordingly, the above description of a specific embodiment is made by way of example only and not for the purposes of limitations. It will be clear to the skilled person that minor modifications may be made without significant changes to the operation described.

The invention claimed is:

1. An optical parametric device comprising a non-linear material that is operable to generate a signal and an idler wave in response to interaction with a pump wave, wherein the non-linear material is a slant-stripe-type periodically poled nonlinear crystal and the non-linear interaction is such that the pump and idler waves are collinear with respect to each other and the signal wave is non-collinear with respect to the pump and idler waves.

2. A device as claimed in claim 1 wherein a pump wave source and the non-linear medium are provided in the same optical cavity.

3. A device as claimed in claim 2 wherein the pump wave and the idler wave are substantially the same and the optical cavity is such that both waves are resonant within it.

4. A device as claimed in claim 1 wherein the non-linear medium is provided in an optical cavity, and the pump wave is coupled into that cavity, wherein the optical cavity is arranged to resonate the pump wave.

5. A device as claimed in claim 4 wherein the pump wave and the idler wave are substantially the same and the optical cavity is such that both waves are resonant within it.

6. A device as claimed in claim 1 that can be used in a pulsed mode and/or a continuous-wave mode.

7. An optical parametric device as claimed in claim 1 wherein the signal wave has one of a frequency radiation of approximately 0.3 THz to approximately 10 THz and a wavelength of approximately 10 microns to approximately 100 microns.

8. An optical parametric device as claimed in claim 1 wherein the optical parametric device is an optical parametric generator.

9. An optical parametric device as claimed in claim 1 wherein the optical parametric device is an optical parametric amplifier.

10. An optical parametric device as claimed in claim 1 wherein the optical parametric device is an optical parametric oscillator.

11. An optical parametric device comprising a non-linear material that is operable to generate a signal and an idler wave in response to being stimulated with a pump wave, wherein a gain medium of the pump wave source and the non-linear material are provided in a first optical cavity arranged to resonate the pump wave, and the non-linear material is positioned in a second optical cavity arranged to resonate the idler wave, wherein the non-linear medium is such that the pump, idler and signal waves are non-collinear with respect to each other.

12. An optical parametric device as claimed in 11 wherein the signal wave has one of a frequency radiation of approximately 0.3 THz to approximately 10 THz and a wavelength of approximately 10 microns to approximately 100 microns.

13. An optical parametric device as claimed in claim 11 wherein the optical parametric device is an optical parametric generator.

14. An optical parametric device as claimed in claim 11 wherein the optical parametric device is an optical parametric amplifier.

15. An optical parametric device as claimed in claim 11 wherein the optical parametric device is an optical parametric oscillator.

16. An optical parametric device comprising a non-linear material that is operable to generate a signal wave and an idler wave in response to being stimulated with a pump wave, wherein the non-linear material is provided in a first optical cavity arranged to resonate the pump wave, and a second optical cavity arranged to resonate the idler wave, the arrangement being such that the pump wave and the generated idler and signal waves are non-collinear with respect to each other.

17. An optical parametric device as claimed in claim 16 wherein the signal wave has one of a frequency radiation of approximately 0.3 THz to approximately 10 THz and a wavelength of approximately 10 microns to approximately 100 microns.

18. An optical parametric device as claimed in claim 16 wherein the optical parametric device is an optical parametric generator.

19. An optical parametric device as claimed in claim 16 wherein the optical parametric device is an optical parametric amplifier.

20. An optical parametric device as claimed in claim 16 wherein the optical parametric device is an optical parametric oscillator.

* * * * *